United States Patent
Wystup (10) Patent No.: US 11,923,730 B2
(45) Date of Patent: Mar. 5, 2024

(54) SYSTEM AND METHOD FOR ESTIMATING ENGINE TEMPERATURE OF AN ENGINE

(71) Applicant: ebm-papst Mulfingen GmbH & Co. KG, Mulfingen (DE)

(72) Inventor: Ralph Wystup, Künzelsau (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 202 days.

(21) Appl. No.: 17/686,611

(22) Filed: Mar. 4, 2022

(65) Prior Publication Data

US 2022/0286022 A1 Sep. 8, 2022

(30) Foreign Application Priority Data

Mar. 8, 2021 (DE) ...................... 10 2021 105 493.1

(51) Int. Cl.
*H02K 11/25* (2016.01)
*H02K 11/21* (2016.01)
(Continued)

(52) U.S. Cl.
CPC ............. *H02K 11/25* (2016.01); *H02K 11/21* (2016.01); *H02K 11/27* (2016.01); *H02P 29/60* (2016.02)

(58) Field of Classification Search
CPC .. H02P 6/00; H02P 21/00; H02P 23/00; H02P 25/00; H02P 2205/00; H02P 29/60; G06F 11/3058; G11B 33/144; H04N 21/42202; H05B 47/105; H05B 47/115; H05B 47/125; H05B 47/13; H05B 47/135;
(Continued)

(56) References Cited

U.S. PATENT DOCUMENTS 9,581,989 B2 * 2/2017 Li ........................... G05B 19/00
2015/0295531 A1 * 10/2015 Kim ........................ H02P 23/14
318/400.22
(Continued)

FOREIGN PATENT DOCUMENTS

DE 1041280 B 10/1958
DE 102008040725 A1 1/2010
(Continued)

OTHER PUBLICATIONS

Yu (CN 104362928 A) A Motor Temperature Obtaining Method, Device And System Date Published Feb. 18, 2015 (Year: 2015).*
(Continued)

*Primary Examiner* — Jorge L Carrasquillo
(74) *Attorney, Agent, or Firm* — Dickinson Wright PLLC (57) ABSTRACT

A system for monitoring the temperature of a motor (M) with an electromechanically drivable motor shaft. The system comprising a sensor that is based on a thermal model (MOD), which describes the thermal behavior of the motor (M), a measuring means for determining the electrical input power (P) of the motor (M), and a measuring means for recording the shaft speed n of the motor shaft. An evaluation device is also provided, which is designed to determine the respectively current motor temperature of the motor (M) from the input power (P), a reference temperature $T_{Ref}$, the determined shaft speed n, and the thermal model (MOD).

18 Claims, 4 Drawing Sheets

(51) Int. Cl.
*H02K 11/27* (2016.01)
*H02P 29/60* (2016.01)

(58) Field of Classification Search
CPC ........ H05B 47/14; H02K 11/25; H02K 11/21; H02K 11/27
See application file for complete search history.

(56) References Cited

U.S. PATENT DOCUMENTS

2017/0155353 A1* 6/2017 Lee .............. H02P 29/664
2020/0280277 A1* 9/2020 Wystup ............ H02P 21/14

FOREIGN PATENT DOCUMENTS

| DE | 102012202938 A1 | 9/2012 |
| DE | 102019202235 A1 | 8/2020 |
| DE | 102019105081 A1 | 9/2020 |
| EP | 2977733 A1 | 1/2016 |

OTHER PUBLICATIONS

Shin (JP 2002252995 A) Controlling Apparatus of Brushless DC Motor Date Published Sep. 6, 2002 (Year: 2002).*

* cited by examiner

Fig. 6

SYSTEM AND METHOD FOR ESTIMATING ENGINE TEMPERATURE OF AN ENGINE

CROSS REFERENCE TO RELATED APPLICATIONS

This application claims the benefit of priority under 35 U.S.C. § 119 to German Patent Application No.: 10 2021 105 493.1, filed Mar. 8, 2021, the contents of which is incorporated herein by reference in its entirety.

FIELD

The invention relates to a system and method for determining or estimating the motor temperature of a motor, in particular to protect against motor overheating. Furthermore, the present disclosure relates to a motor designed with such a system.

BACKGROUND

The statements in this section merely provide background information related to the present disclosure and several definitions for terms used in the present disclosure and may not constitute prior art.

Known methods for recording the temperature of the motor include, for example, installing sensors in the winding, determining the winding temperature using state estimators (Kalman filter, gradient method) from the motor differential equations, directly measuring the winding resistance during operation by coupling in a measuring voltage, or calculating the motor temperature based on motor thermal network models.

Recently, attempts have increasingly been made to determine the temperature inside an electric motor, but without having to install a temperature sensor or a similar measuring device in the motor, i.e. in the electromechanical part of the motor.

DE 10 2008 040 725 A1 discloses a method for determining a rotor temperature of a permanently excited synchronous motor, in which an estimated value for the rotor temperature is determined by means of a Kalman filter containing a thermal model of the synchronous motor.

Another method for determining a winding temperature of a field winding of a separately excited synchronous motor using a Kalman filter is known from EP 2977733 A1. In this case, a first estimated temperature value of the winding temperature is specified for a starting point in time, an electrical excitation voltage present at the field winding and an electrical excitation current flowing through the field winding are recorded at different measurement points in time following the starting point in time, and an updated temperature estimated value is recursively calculated for each measurement point in time as a function of the excitation voltage recorded at the time of measurement, the excitation current recorded at the time of measurement, and a previous estimated temperature value.

DE 102019105081 A1 discloses a device for determining the temperature of a winding of an induction motor formed with a stator and a rotor, comprising at least one first Kalman filter (K1) for calculating the temperature and an induction field controller for vector control of the induction motor with at least one Id current controller which is designed to apply a high-frequency voltage signal (HF) to the winding voltage in order to obtain a winding current with a high-frequency superimposed current component for the winding, which superimposed current is fed to the Kalman filter (K1), the Kalman filter (K1) having a high-frequency model of the motor in order to use this to determine the high-frequency resistance of the winding and, in turn, the winding temperature using a calculation function.

However, the methods known in the prior art also each have specific disadvantages in the implementation or in the application, so that there is still a need to determine reliable monitoring of the motor temperature inside an electric motor, but without having to install a temperature sensor or a similar measuring device in the motor, i.e. in the electromechanical part of the motor.

SUMMARY

The object of the present disclosure is therefore to overcome the aforementioned disadvantages and to propose an efficient system and method for recording the motor temperature of a motor, in particular for protecting the motor from overheating.

The basic idea of the present disclosure is to design a sensor in such a way that it determines the temperature inside the motor based on a thermal model that maps the thermal motor behavior, the electrical input power, and preferably also the shaft speed, and a reference temperature.

According to one aspect of the present disclosure, a system for monitoring the temperature of a motor (M) with an electromechanically drivable motor shaft is provided. This system comprises a sensor that is based on a thermal model (MOD), which describes the thermal behavior of the motor (M), a measuring means for determining the electrical input power (P) of the motor (M), and a measuring means for recording the shaft speed n of the motor shaft. An evaluation device is also provided, which is designed to determine the respectively current motor temperature of the motor (M) from the input power (P), a reference temperature $T_{Ref}$, the determined shaft speed n, and the thermal model (MOD).

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawing, in which.

The drawing is provided herewith for purely illustrative purposes and is not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

According to one aspect of the present disclosure, a system for monitoring the temperature of a motor with an electromechanically drivable motor shaft is provided, comprising a "virtual" sensor that is based on a thermal model which describes the thermal behavior of the motor, a measuring means for determining the electrical input power of the motor, and a measuring means for recording the shaft speed of the motor shaft, with an evaluation device also being provided, which is designed to determine the respectively current motor temperature of the motor from the input power, a reference temperature $T_{Ref}$, the determined shaft speed n, and the thermal model.

According to another aspect of the present disclosure, it is provided that the thermal model (MOD) is or comprises a differential equation system, which simulates the thermal behavior of the motor. Thus, by solving the differential equation system when supplying the values required therefor, this can be solved and a motor temperature calculation can be obtained. In this respect, the sensor based on the differential equation system can also be understood as a virtual sensor.

In a likewise manner, the differential equation system used is characterized by a specific property in that it enables several alternative solution methods for determining the temperature, such as by means of numerical integration or by means of an analog calculation method based on an analog computer or by means of an analog calculation method using a model comprising passive components. In principle, other solution methods would also be conceivable.

A further aspect of the present disclosure relates not only to the system for monitoring the temperature but also to a method for monitoring the temperature. According to this aspect of the present disclosure, a method is provided for this purpose, in particular with a system as described above using a differential equation system (DGL), which describes the thermal behavior of the motor, with the following steps:

a. recording the electrical input power of the motor;
b. calculating the mechanical shaft power from the recorded speed of the motor and determining the corresponding torque of the motor;
c. calculating the thermal power loss that leads to the increase in motor temperature, in particular by subtracting the mechanical shaft power from the electrical input power; and
d. the determined thermal power loss is fed into the differential equation system as an input variable for solving the differential equation system and a temperature increase is calculated therefrom, in particular using an additional reference temperature $T_{ref}$, which is added to the temperature increase in order to determine the motor temperature therefrom.

In a first advantageous aspect of the present disclosure, it is provided that said method is characterized in that the differential equation system for determining the motor temperature is solved by numerical integration (e.g. according to Euler, . . . , Runge Kutta, etc.).

In two alternative embodiments, it is provided that the solution of the differential equation system for determining the motor temperature is calculated analogously, either by using a corresponding circuit in the manner of an analog computer with appropriate computer modules or alternatively on the basis of suitable RC modules and passive components. When passive RC systems are used, the current and/or voltage sources can be used with OP or transistor circuits.

In the specified embodiments, it may be advantageous if the electrical input power of the motor is recorded by measuring an intermediate circuit voltage and an intermediate circuit current and by multiplying the two measured values, preferably using a microcomputer or by obtaining it from the intermediate circuit voltage. For this purpose, possible implementations are explained in more detail in the various embodiments mentioned later.

The speed is determined, for example, by measuring the frequency of the phase voltage and determining the corresponding torque from a correspondingly stored characteristic map, or by means of the q component of the current iq, or using a strain gauge, particularly in the case of the embodiment with numerical integration.

In principle, a voltage proportional to the speed can be generated by means of an analog frequency-voltage conversion from a motor phase voltage to be measured in order to determine the shaft power therefrom. Alternative ways of determining the shaft power are also conceivable.

Other advantageous refinements of the invention are described in greater detail in the following, in conjunction with reference to the figures in which the same reference numbers refer to the same functional and/or structural features.

Figure 1:
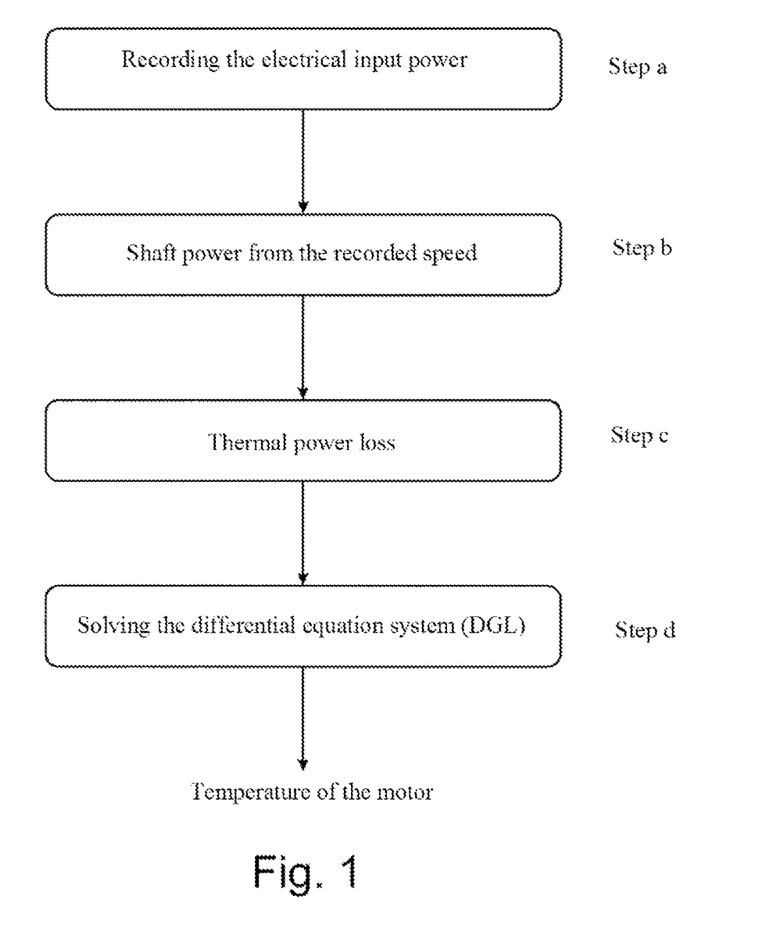
FIG. 1 is a schematic representation of one aspect of the present disclosure.
Figure 2:
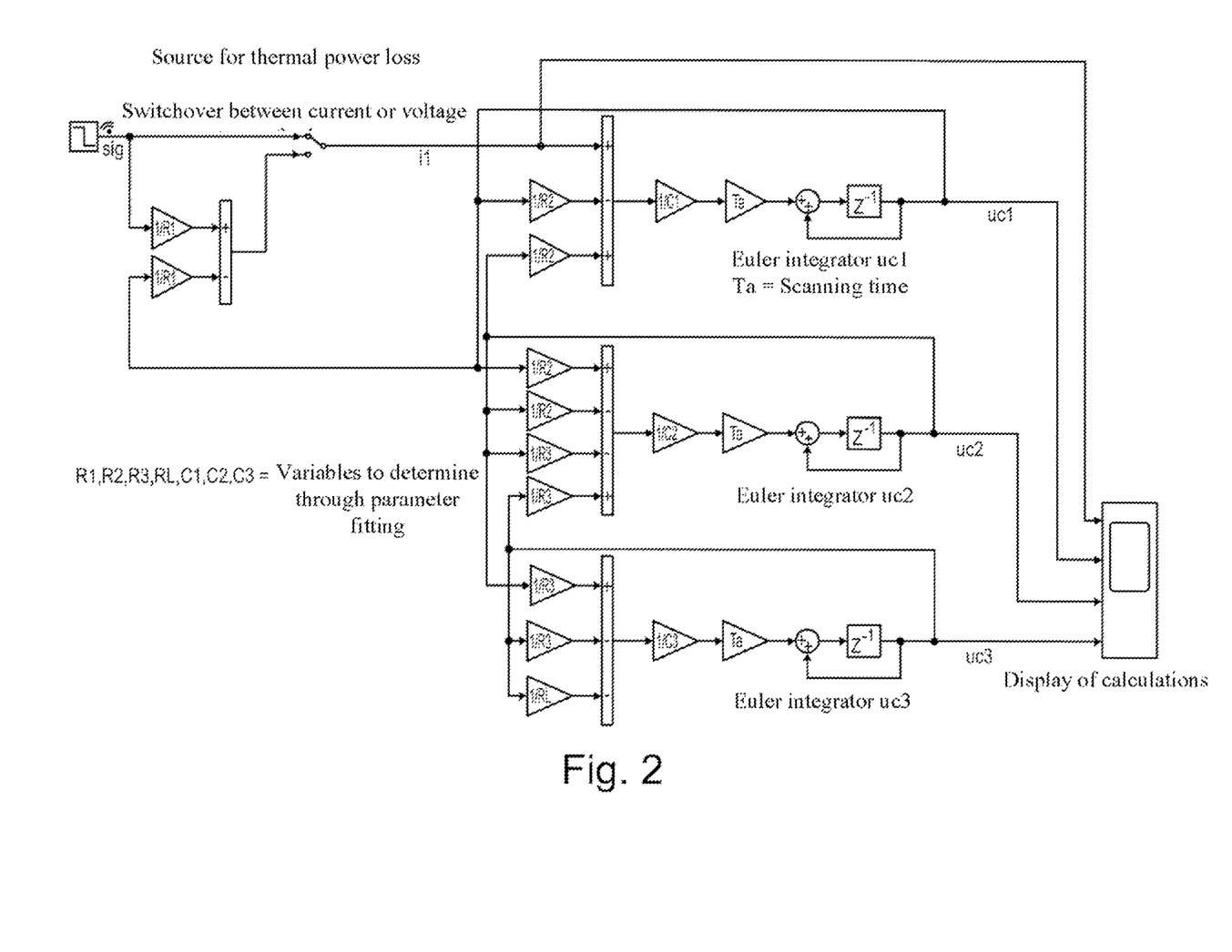
FIG. 2 represents an implementation of the calculation method with Matlab Simulink software (without real data acquisition) for automatic code generation.
Figure 3:
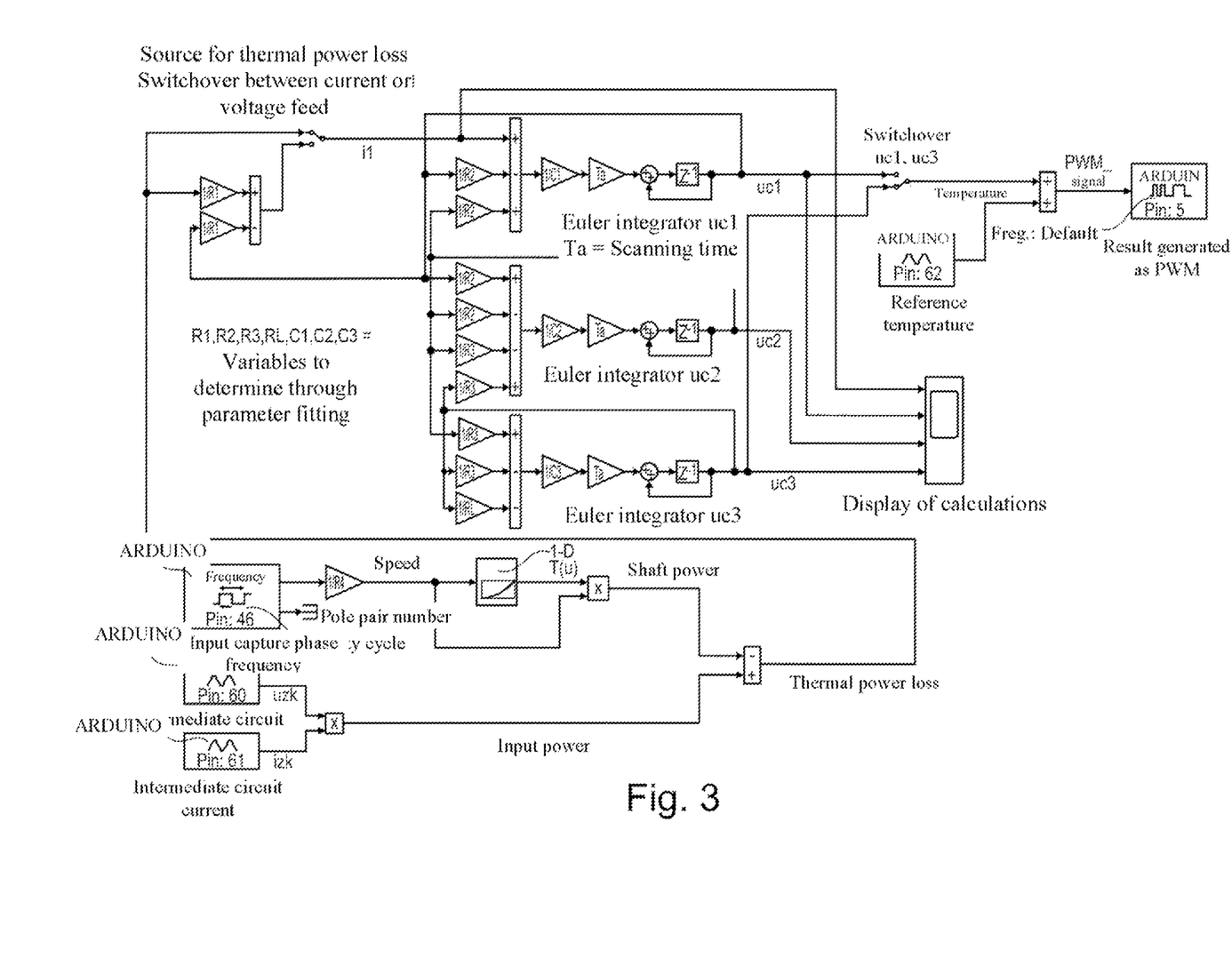
FIG. 3 represents an implementation of the calculation method with Matlab Simulink software (with specific data acquisition) for automatic code generation.

First, three alternative design variants are described with reference to FIG. 1. The following method steps for determining the motor temperature are shown in FIG. 1.

Step a: recording the electrical input power of the motor;
Step b: calculating the mechanical shaft power from the recorded speed of the motor and determining the corresponding torque of the motor;
Step c: calculating the thermal power loss that leads to the increase in motor temperature, in particular by subtracting the mechanical shaft power from the electrical input power; and
Step d: the determined thermal power loss is fed into the differential equation system as an input variable for solving the differential equation system and a temperature increase is calculated therefrom, in particular using an additional reference temperature $T_{ref}$, which is added to the temperature increase in order to determine the motor temperature therefrom.

According to one aspect of the present disclosure, using numerical integration to solve the differential equations, steps a) through d) are characterized as follows.

Figure 4:
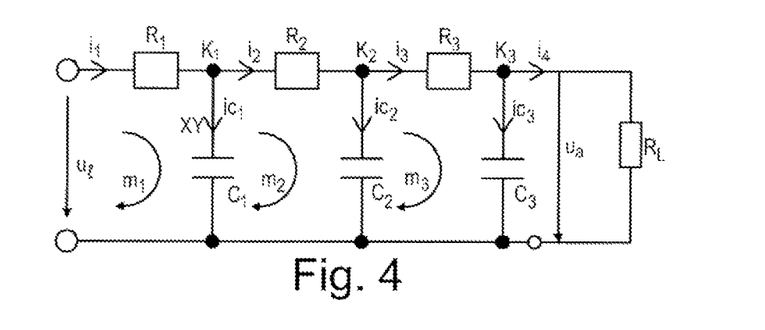
FIG. 4 is an RC chain circuit to explain an implementation draft using differential equations.

One implementation design of an RC chain circuit according to FIG. 4 is shown in the following. With the RC chain circuit, three parallel RC meshes are implemented with resistors $R_1$, $R_2$, $R_3$, $R_L$ and capacitors C1, C2, C3. Furthermore, nodes K1, K2, and K3 are specified, at which currents i1, i2, and i3 or $i_{c1}$, $i_{c2}$, and $i_{c3}$ are divided. Current i1 flows to the first node K1 and then divides into current i2 and $i_{c1}$. FIG. 4 shows how the currents are divided among the meshes accordingly. Voltage $U_R$ is present between the terminals. The voltage drop across capacitors C1, C2, C3 is denoted by $U_{C1}$, $U_{C2}$, and $U_{C3}$. $U_e$ denotes the voltage at the input and $U_a$ denotes the voltage at the output.

The following relationships apply here:

$$U_R = i_1 R_1 + U_{C1}$$

$$i_1 = i_{c1} + i_2 \rightarrow (i_1 - i_2) \cdot 1/C1 = dU_{C1}/dt \qquad \text{K1:}$$

$$i_2 = i_{c2} + i_3 \rightarrow (i_2 - i_3) \cdot 1/C2 = dU_{C2}/dt \qquad \text{K2:}$$

$$i_3 = i_{c3} + i_4 \rightarrow (i_3 - i_4) \cdot 1/C3 = dU_{C3}/dt \qquad \text{K2:}$$

For $i_4$ $i_4 = 0$ (no load) applies
$i_4 = U_{C3}/R_L$ (with load)

The currents each represent thermal power and the voltages represent temperatures. The thermal model is thus calculated analogous to the electrical model shown. The electrical resistances are then analogous to the thermal resistances, and the capacitors represent the thermal capacitances.

With the additional conditions $$(U_e - U_{C1}) \cdot 1/R_1 = i_1 \qquad \text{M1:}$$

$$(U_{C1} - U_{C2}) \cdot 1/R_2 = i_2 \qquad \text{M2:}$$

$$(U_{C2} - U_{C3}) \cdot 1/R_3 = i_3 \qquad \text{M3:}$$

When the feed is with a current source, $i_1$ is predetermined or impressed, which means that equation M1 becomes obsolete (as explained above, considered in the analogy of the calculation.)

The following relationships then apply to the state space:

$$\frac{dU_{C1}}{dt} = \frac{1}{C1} \cdot \left( \frac{U_e}{R_1} - \frac{U_{C1}}{R_1} - \left( \frac{U_{C1}}{R_2} - \frac{U_{C2}}{R_2} \right) \right)$$

$$\frac{dU_{C2}}{dt} = \frac{1}{C2} \cdot \left( \frac{U_{C1}}{R_2} - \frac{U_{C2}}{R_2} - \left( \frac{U_{C2}}{R_3} - \frac{U_{C3}}{R_3} \right) \right)$$

$$\frac{dU_{C3}}{dt} = \frac{1}{C3} \cdot \left( \frac{U_{C2}}{R_3} - \frac{U_{C3}}{R_3} - (i_4) \right)$$

where $i_4 = \frac{U_{C3}}{R_L}$ $$\begin{pmatrix} \frac{dU_{C1}}{dt} \\ \frac{dU_{C2}}{dt} \\ \frac{dU_{C3}}{dt} \end{pmatrix} =$$

$$\begin{pmatrix} \frac{-1}{R_1 C_1} - \frac{1}{R_2 C_1} & \frac{1}{R_2 C_1} & 0 \\ \frac{1}{R_2 C_2} & \frac{-1}{R_2 C_2} - \frac{1}{R_3 C_2} & \frac{1}{R_3 C_2} \\ 0 & \frac{1}{R_3 C_3} & \frac{-1}{R_3 C_3} - \frac{1}{R_L C_3} \end{pmatrix} \cdot \begin{pmatrix} U_{C1} \\ U_{C2} \\ U_{C3} \end{pmatrix} + U_R \begin{pmatrix} \frac{1}{R_1 C_1} \\ 0 \\ 0 \end{pmatrix}$$

The electrical input power (to supply the thermal DGL system) can be recorded, for example, by measuring the intermediate circuit voltage and the intermediate circuit current (two AD channels) and by multiplying the two values in a microcomputer implemented for this purpose.

The mechanical shaft power can be calculated from the speed (by measuring the frequency of the phase voltage using timers), and the associated torque can be calculated from a correspondingly stored characteristic map. Alternatively, the torque can be calculated using the current iq (which can be calculated using the rotor position and the three-phase current or is provided by the commutation program). Alternatively, the torque can also be measured using a strain gauge.

The mechanical shaft power is subtracted from the electrical input power, and this difference results in the thermal power (namely: power loss) which leads to the heating of the motor. The magnetic power in the input power, which represents reversible reactive power, is only present when there is a change in the phase current (the effective value) and can be recorded if necessary with frequent speed and load changes, e.g. via a correspondingly dependent constant, characteristic map, or as an input value from an arithmetic circuit for the exact calculation of the power balance. However, the heating that occurs due to the current (through the winding resistances) for storing the magnetic power (reactive power) is automatically taken into account.

The calculated thermal power (power loss) is then fed into the differential equation system as an input variable, and a temperature increase as a result of this power is calculated from this. The temperature increase calculated using the differential equation system and the input power is then added to the measured reference temperature, and the estimated temperature inside the motor is obtained.

Subsequently, the output of the temperature, e.g. as an analog signal via a DA converter of any design, can take place via a data bus or as a binary threshold and alarm value at a pin.

In a second embodiment, the analog calculation is used. The differential equation system is thus calculated analogously, specifically in that the corresponding circuit is set up on the printed circuit board (PCB) in the manner of an analog computer. The necessary operational amplifiers, adders, subtractors, constant potentiometers (multiplication with constants), function generators (for the torque characteristic(s)), and integrators are required for this. These are used to carry out steps a) to d) as follows:

The electrical input power is preferably recorded from the intermediate circuit using suitable voltage dividers for the intermediate circuit voltage and shunts for current measurement, as well as operational amplifiers (OP) for signal amplification. The multiplication to calculate the input power is then done with the help of suitable OP circuits (multipliers) or with the help of special (analog or digital) multiplier modules (modulation methods or calculations). If the intermediate circuit voltage is constant and the constancy is also monitored, it is sufficient to transfer the measured current to the input power with a constant amplification.

With the help of an analog frequency-voltage conversion, a voltage proportional to the speed can be generated from the phase voltage of the motor. Multiplying this voltage by a voltage proportional to the torque using an analog multiplier or a controlled amplifier (gain control) gives the shaft power.

Such a voltage, which is proportional to the torque, can be obtained, for example, with the aid of an analog or digital function generator (the speed is then the input variable). To this end, the characteristic curve of the fan wheel driven by the motor is stored in the function generator.

The subtraction of the mechanical shaft power from the electrical input power also in this case results in the thermal power (power loss) which leads to heating of the motor. This thermal power is then supplied to the differential equation system as an input variable, as in the aforementioned exemplary embodiment, for calculating the motor temperature.

If the differential equation system is supplied with a voltage, the value of which corresponds to the thermal power loss, the differential equation system supplies the desired temperature increase at its last capacitor. If the differential equation system is supplied with the thermal power loss as a current source, the voltage at the first capacitor supplies the desired temperature increase.

The temperature increase calculated using the analog differential equation system and the input power is then added to the measured reference temperature, and the estimated temperature inside the motor is obtained. The above-mentioned adder circuit then supplies an analog output voltage proportional to the motor temperature, which output voltage can simply be displayed and/or forwarded or can be used to switch off the motor using a comparator.

In a third embodiment of FIG. 1, an analog calculation is also used. To do this, one makes use of the fact that there are solutions in the development of electronic analog computers to tackle problems by forming direct (electrical) analogies with the help of passive elements such as resistors, capacitors, and inductors. The underlying paths can be modeled with a network of resistors. If the supply is implemented with AC voltage or a voltage in pulse mode between the input and/or capacitances and inductances and the output, the shortest path is found by following the greatest current flow at each node. The basic principle of the solution is based on current division through a resistor network with elements in parallel and in series. Such systems are also referred to as analog cellular automata. With the help of such an adapted RC network (resistors and capacitors), the real temperature behavior of the motor can be simulated after calibration (i.e. determination of the R and C values). The cellular automaton used can also be a simple RC chain circuit.

In this embodiment, steps a) to d) then take place as follows:

The electrical input power is recorded using suitably dimensioned voltage dividers for the intermediate circuit voltage and shunts for current measurement, as well as operational amplifiers (OP) for signal amplification. The multiplication to calculate the input power is then done with the aid of suitable OP circuits (multipliers) or with the aid of special (analog or digital) multiplier modules (modulation methods or calculations).

The shaft power is determined analogously to the steps described for the second exemplary embodiment. The subtraction of the mechanical shaft power from the electrical input power also results in the thermal power (power loss) which leads to heating of the motor. Operational amplifier circuits are used for subtracting and supplying the RC network with controlled sources; the same applies to the other mathematical operations and/or transistor circuits mentioned in this approach. The actual RC network is to be considered passive here. If the RC network is supplied with a voltage source (FIG. 6), the value of which corresponds to the thermal power loss, the end (voltage at the load resistor or at the last capacitor) of the corresponding RC chain provides the desired temperature increase. On the other hand, if the RC network is supplied with the thermal power loss as a current source (FIG. 5), the beginning (voltage at the current source or at the first capacitor) of the RC chain provides the desired temperature increase.

Figure 5:
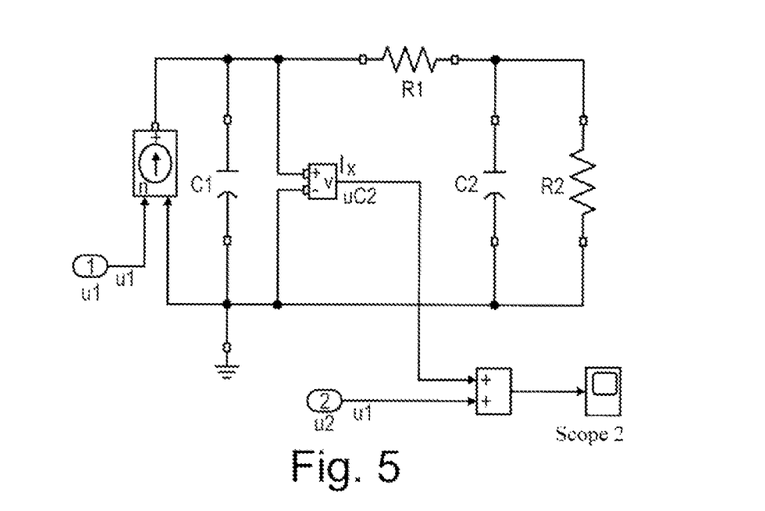
FIG. 5 represents an implementation approach of a CRCR network with a voltage source.

FIG. 5 shows a CRCR network and a supply with a controlled current source. The control signal of the current source forms said calculated thermal power loss. The current source can be configured with operational amplifiers, e.g. according to Tietze Schenk.

Figure 6:
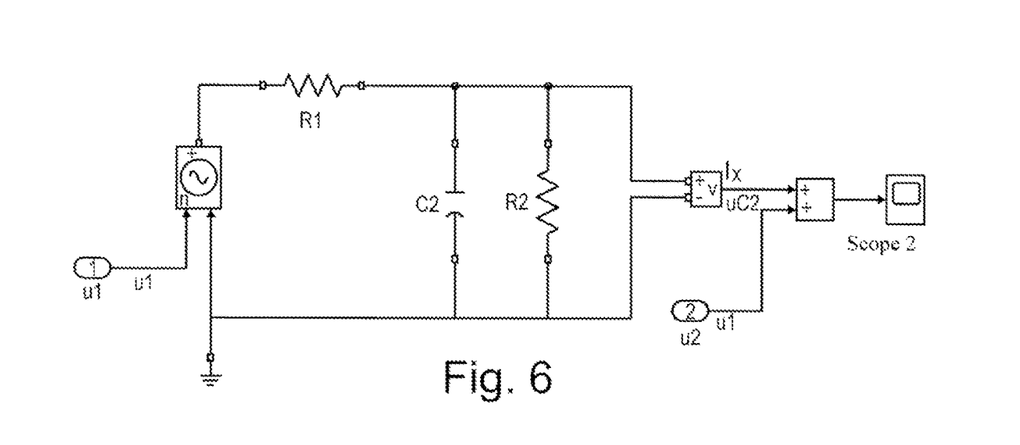
FIG. 6 represents another implementation approach of a CRCR network with a voltage source.

FIG. 6 shows a CRCR network and a supply with a controlled voltage source. The control signal of the voltage source forms said calculated thermal power loss. The components for R and C are determined using a parameter fit based on the values measured on the real motor. The voltage source can be configured with operational amplifiers, e.g. according to Tietze Schenk.

The measurement of the respective voltages on the RC network (OP circuit) when the RC network is supplied with voltage or current sources then provides the temperature increase. The measured ambient temperature is added to this temperature increase (analog voltage) in the form of an analog voltage.

The thermal model can be implemented and calculated in any embodiment, depending on the requirements. This idea corresponds to the modular system or the modular solution according to the invention.

The design of the invention is not limited to the preferred or exemplary embodiments indicated above. Rather, a number of variants is conceivable, which make use of the presented solution even for fundamentally different designs. Thus, it will be appreciated that the invention is susceptible to modification, variation and change without departing from the proper scope and fair meaning of the accompanying claims.

The invention claimed is:

1. A method for monitoring the temperature of a motor (M) with an electromechanically drivable motor shaft using a differential equation system (DGL) which describes the thermal behavior of the motor (M), the motor (M) being in a system that includes: a sensor based on a thermal model (MOD), which describes thermal behavior of the motor (M); a measuring means for determining electrical input power (P) of the motor (M); and a measuring means for recording shaft speed n of the motor shaft, wherein an evaluation device is also provided, which is configured to determine, respectively, current motor temperature of the motor (M) from the input power (P), a reference temperature $T_{Ref}$, the determined shaft speed n, and the thermal model (MOD);
the method comprising the following steps:
 a. recording the electrical input power of the motor;
 b. calculating the mechanical shaft power from the recorded speed of the motor (M) and determining the corresponding torque of the motor (M);
 c. calculating the thermal power loss that leads to the increase in motor temperature, in particular by subtracting the mechanical shaft power from the electrical input power; and
 d. the determined thermal power loss is fed into the differential equation system (DGL) as an input variable for solving the differential equation system (DGL), and a temperature increase is calculated therefrom, in particular using an additional reference temperature $T_{ref}$, which is added to the temperature increase in order to determine the motor temperature therefrom.

2. The method according to claim 1, wherein the differential equation system (DGL), as a modular system, enables several alternative solution methods for determining the temperature, by means of numerical integration, by means of an analog calculation method based on an analog computer, or by means of an analog calculation method by means of a model comprising passive components.

3. The method according to claim 1, wherein the differential equation system (DGL) for determining the motor temperature is solved by numerical integration.

4. The method according to claim 3, wherein the electrical input power of the motor is recorded by measuring an intermediate circuit voltage and an intermediate circuit current and by multiplying the two measured values by means of a microcomputer or programmable circuits.

5. The method according to claim 3, wherein a voltage proportional to the speed is generated from a phase voltage of the motor to be measured with the aid of an analog frequency-voltage conversion in order to determine the shaft power therefrom.

6. The method according to claim 1, wherein the solution of the differential equation system (DGL) for determining the motor temperature is calculated analogously by using a corresponding circuit in the manner of an analog computer with corresponding computer modules or on the basis of freely programmable circuits or by means of suitable RC modules and passive components.

7. The method according to claim 1, wherein the electrical input power of the motor is recorded by measuring an intermediate circuit voltage and an intermediate circuit current and by multiplying the two measured values by means of a microcomputer or programmable circuits.

8. The method according to claim 7, wherein the speed is determined by measuring the frequency of the phase voltage and determining the corresponding torque from a correspondingly stored characteristic map, or by means of the q component of the current iq, or by means of a strain gauge.

9. The method according to claim 7, wherein a voltage proportional to the speed is generated from a phase voltage of the motor to be measured with the aid of an analog frequency-voltage conversion in order to determine the shaft power therefrom.

10. The method according to claim 1, wherein the speed is determined by measuring the frequency of the phase voltage and determining the corresponding torque from a correspondingly stored characteristic map, or by means of the q component of the current iq, or by means of a strain gauge.

11. The method according to claim 10, wherein a voltage proportional to the speed is generated from a phase voltage of the motor to be measured with the aid of an analog frequency-voltage conversion in order to determine the shaft power therefrom.

12. The method according to claim 1, wherein a voltage proportional to the speed is generated from a phase voltage of the motor to be measured with the aid of an analog frequency-voltage conversion in order to determine the shaft power therefrom.

13. A method for monitoring the temperature of a motor (M) with an electromechanically drivable motor shaft using a differential equation system (DGL) which simulates the thermal behavior of the motor (M), the motor (M) being in a system that includes: a sensor based on a thermal model (MOD), which describes thermal behavior of the motor (M); a measuring means for determining electrical input power (P) of the motor (M); and a measuring means for recording shaft speed n of the motor shaft, wherein an evaluation device is also provided, which is configured to determine, respectively, current motor temperature of the motor (M) from the input power (P), a reference temperature $T_{Ref}$, the determined shaft speed n, and the thermal model (MOD);

the method comprising with the following steps:
a. recording the electrical input power of the motor;
b. calculating the mechanical shaft power from the recorded speed of the motor (M) and determining the corresponding torque of the motor (M);
c. calculating the thermal power loss that leads to the increase in motor temperature, in particular by subtracting the mechanical shaft power from the electrical input power; and
d. the determined thermal power loss is fed into the differential equation system (DGL) as an input variable for solving the differential equation system (DGL), and a temperature increase is calculated therefrom, in particular using an additional reference temperature $T_{ref}$, which is added to the temperature increase in order to determine the motor temperature therefrom;

wherein the differential equation system (DGL), as a modular system, enables several alternative solution methods for determining the temperature, by means of numerical integration, by means of an analog calculation method based on an analog computer, or by means of an analog calculation method by means of a model comprising passive components.

14. The method according to claim 13, wherein the differential equation system (DGL) for determining the motor temperature is solved by numerical integration.

15. The method according to claim 13, wherein the solution of the differential equation system (DGL) for determining the motor temperature is calculated analogously by using a corresponding circuit in the manner of an analog computer with corresponding computer modules or on the basis of freely programmable circuits or by means of suitable RC modules and passive components.

16. The method according to claim 13, wherein the electrical input power of the motor is recorded by measuring an intermediate circuit voltage and an intermediate circuit current and by multiplying the two measured values by means of a microcomputer or programmable circuits.

17. The method according to claim 13, wherein the speed is determined by measuring the frequency of the phase voltage and determining the corresponding torque from a correspondingly stored characteristic map, or by means of the q component of the current iq, or by means of a strain gauge.

18. The method according to claim 13, wherein a voltage proportional to the speed is generated from a phase voltage of the motor to be measured with the aid of an analog frequency-voltage conversion in order to determine the shaft power therefrom.

* * * * *